United States Patent [19]

Isaac

[11] Patent Number: 4,565,383
[45] Date of Patent: Jan. 21, 1986

[54] FRONT AND REAR WHEEL DROP OUTS FOR BICYCLE FRAMES

[75] Inventor: Timothy S. Isaac, Fall River, Wis.

[73] Assignee: Trek Bicycle Corporation, Waterloo, Wis.

[21] Appl. No.: 576,571

[22] Filed: Feb. 3, 1984

[51] Int. Cl.[4] .............................................. B62K 19/30
[52] U.S. Cl. ................................... 280/276; 228/154; 280/279; 280/281 R; 280/288; 403/174; 403/178; 403/272
[58] Field of Search ........... 280/276, 274, 279, 281 R, 280/281 B, 284, 286, 287, 288; 29/DIG. 4; 228/154; 403/178, 174, 272, 271, 205, 403; 285/150, 156, 286

[56] References Cited

U.S. PATENT DOCUMENTS

| 2,144,332 | 1/1939 | Glaser | 228/154 |
| 2,149,844 | 3/1939 | George | 403/174 X |
| 2,435,448 | 2/1948 | Kraeft et al. | 228/154 |

FOREIGN PATENT DOCUMENTS

| 731498 | 5/1932 | France | 280/279 |
| 2371337 | 7/1978 | France | 280/281 R |
| 22483 | of 1896 | United Kingdom | 280/281 R |

*Primary Examiner*—Joseph F. Peters, Jr.
*Assistant Examiner*—Mitchell J. Hill
*Attorney, Agent, or Firm*—McWilliams, Mann, Zummer and Sweeney

[57] ABSTRACT

Front and rear wheel drop outs for bicycle frames that are specially suited for bicycle frames of the tubular strut type used in light weight high performance high quality bicycles, the frames of which comprise a plurality of tubular strut members interconnected by lugs and brackets to form the well known generally diamond shaped frame that includes the familiar head, top, down, and seat tubes, the familiar pair of seat stay tubes, and the familiar pair of chain stay tubes. The invention provides for a special front wheel fork tip arrangement of the drop out type that is applied and brazed, socket fitted, relation to each fork blade of the front wheel mounting fork assembly, and a special rear wheel drop out bracket arrangement involving right hand side and left hand side drop outs that are formed to receive in brazed, socket fitted, relation the bicycle frame seat stay tube and the frame chain stay tube that is to be made fast to same.

8 Claims, 16 Drawing Figures

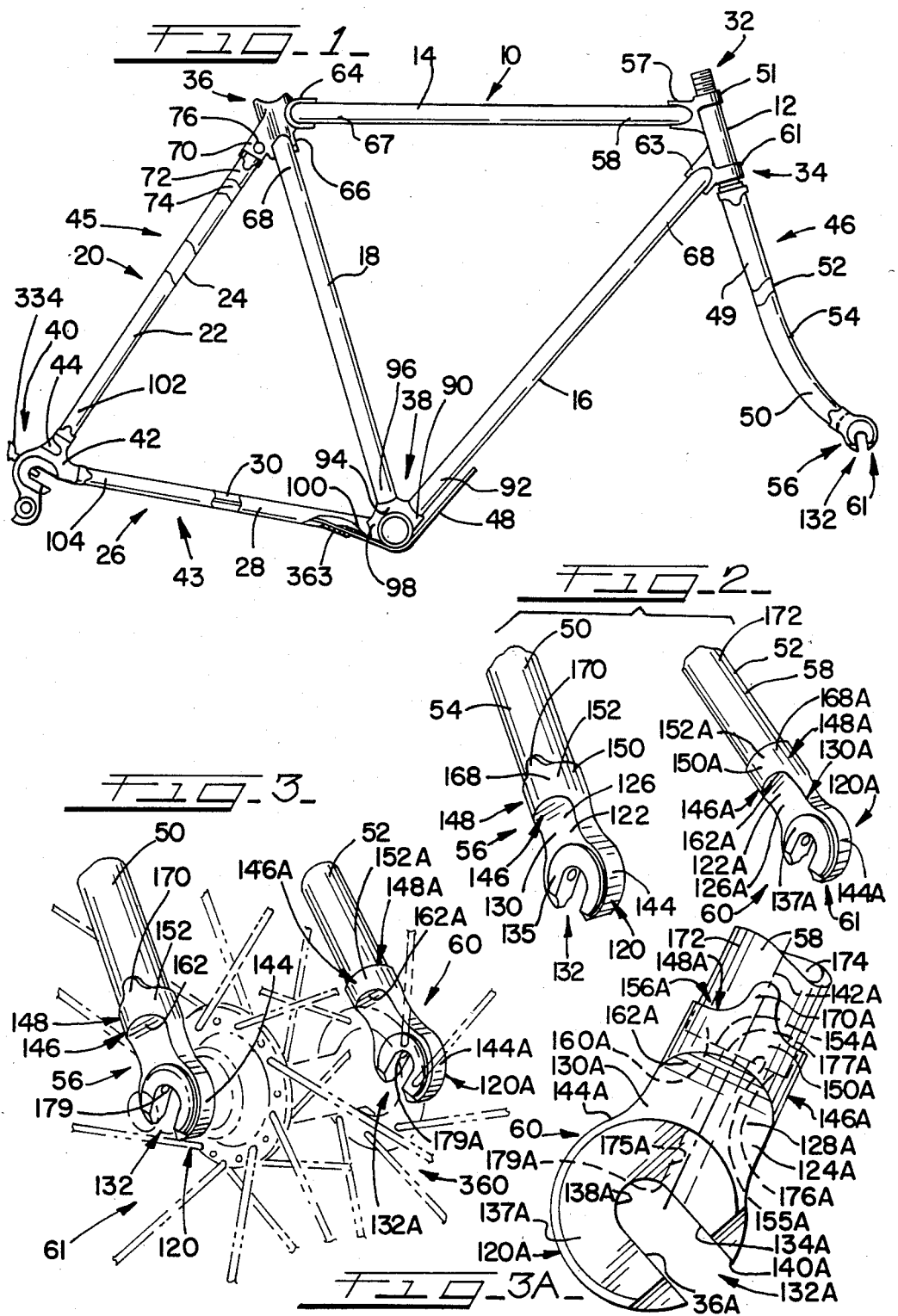

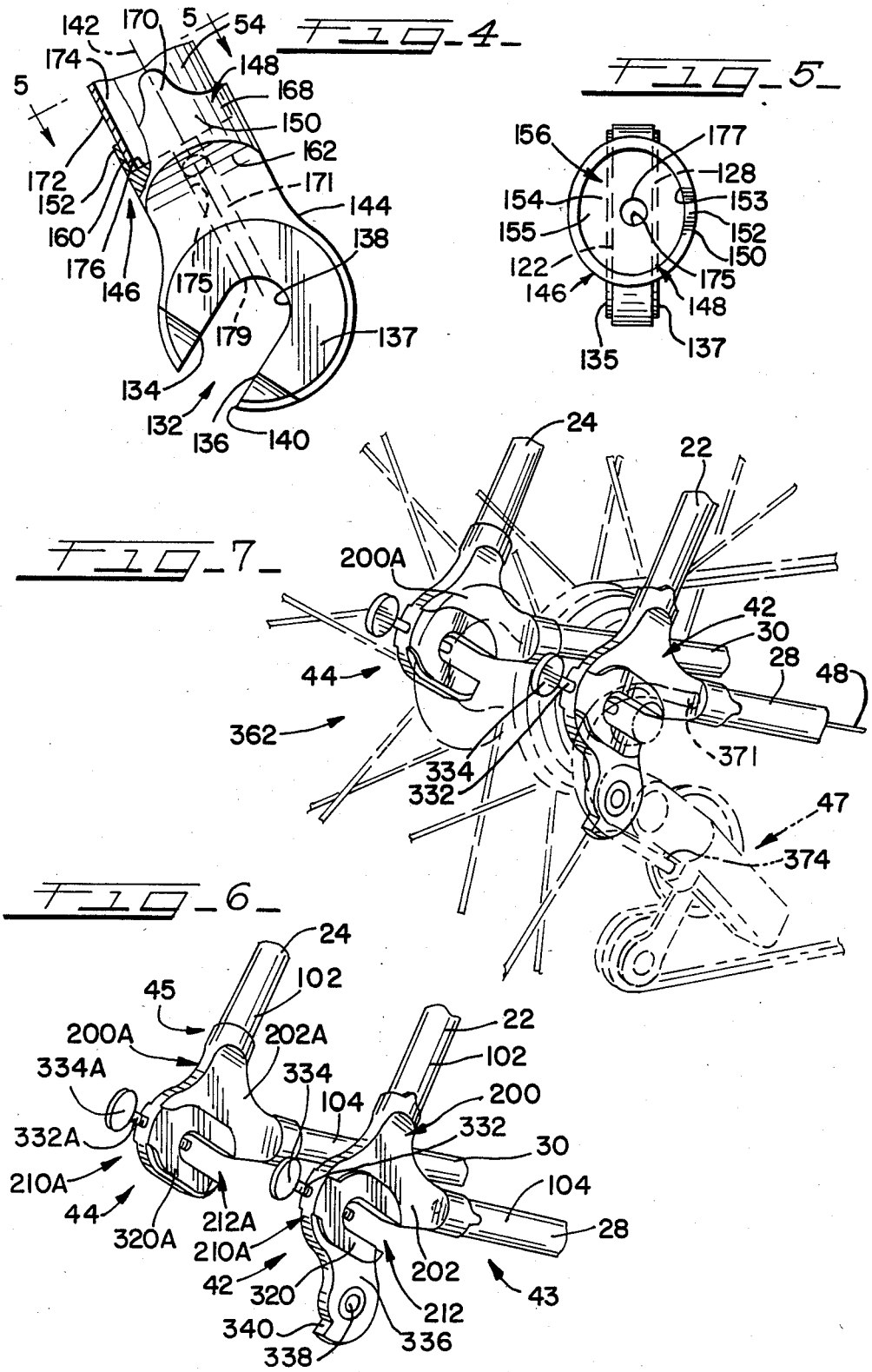

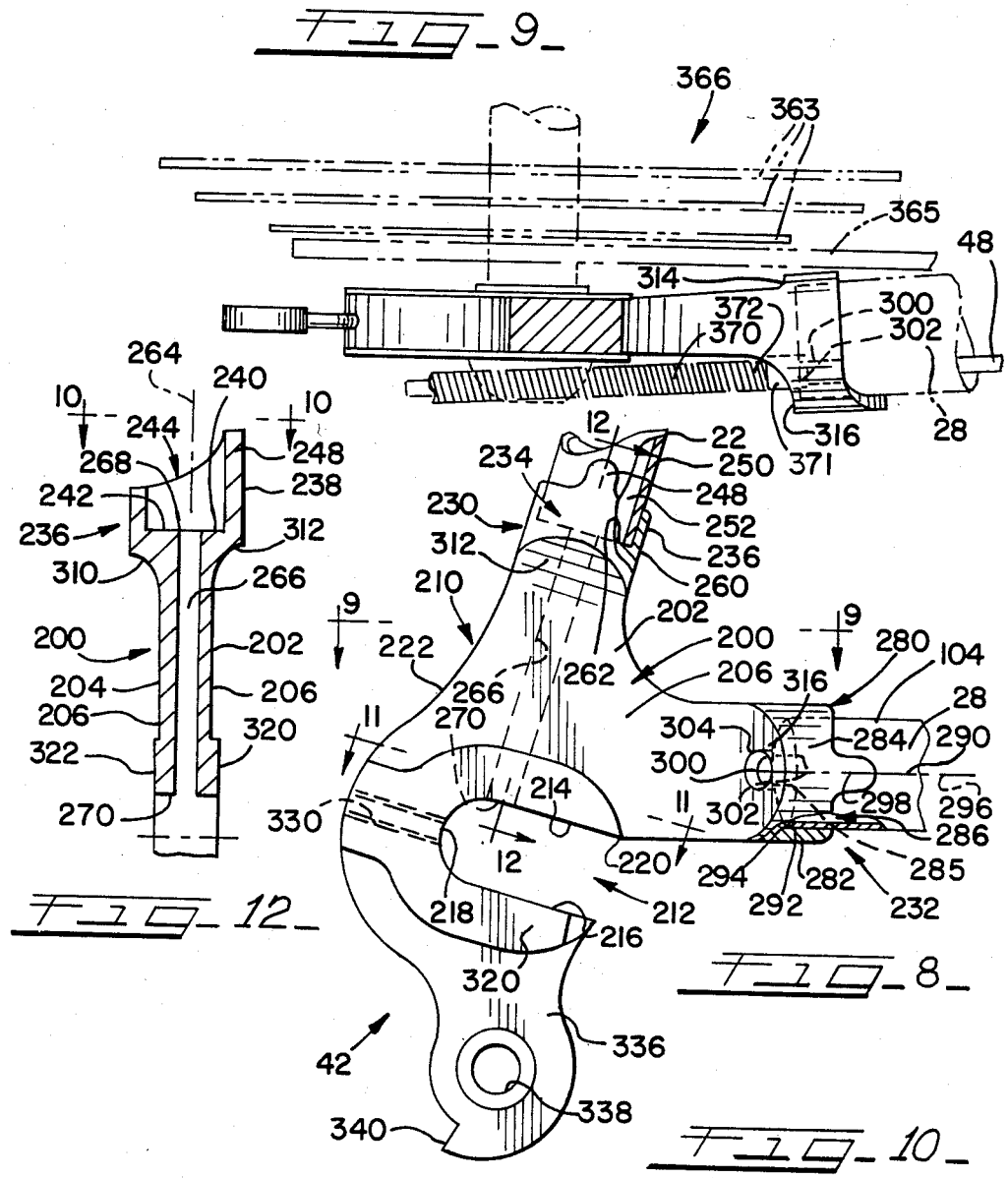
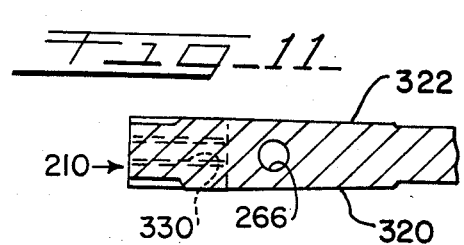
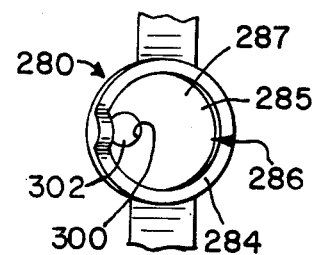

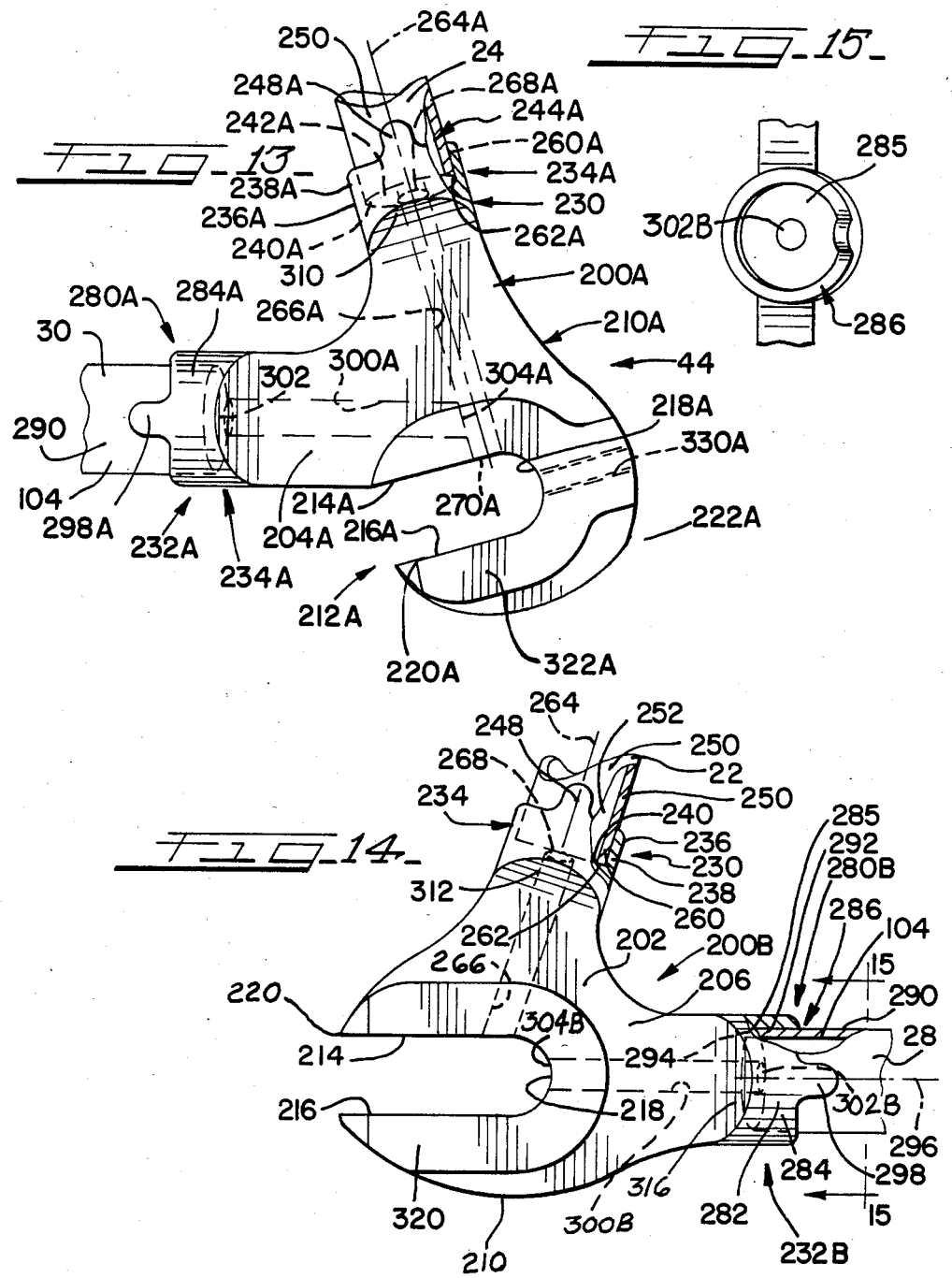

FRONT AND REAR WHEEL DROP OUTS FOR BICYCLE FRAMES

This invention relates to front and rear wheel drop out arrangements for bicycles, and more particularly, for high quality, light weight, high performance, bicycles, for trouble free connection of the frame fork blades to the fork tips of the bicycle front wheel fork assembly, and for trouble free connection of the bicycle frame seat stay and chain stay tubes to the rear drop outs they are to be anchored to, with maximized efficiency, minimum time of application and heating of the frame tubing, and provision of joints at the front and rear drop outs that are aesthetically pleasing in appearance after completion of the joint and that require no machining for aesthetic purposes.

As is well known in the art, high performance, high quality bicycles, such as those used for racing, commonly have the frame arranged in the form of the well known classic diamond shaped configuration, in which the frame is of tubular component or strut construction, as this type of bicycle frame shape has an important basic rigidity, and the tubular construction involved reduces the weight factor. The concern with frame rigidity and bicycle weight, of those involved in the manufacture and assembly of such frames, involves interrelated factors that are highly significant in the case of high performance, high quality bicycles. For instance, the frame must have the strength to adequately carry the rider's weight and resist riding strain directly, including the pedaling pressure exerted by the rider that is necessarily alternate and on opposite sides of the frame. It is well known, in this connection, that the pedaling response of the bicycle is roughly inverally proportional to its weight, and the pedaling ease of the bicycle is roughly directly to the bicycle frame rigidity and alignment. High quality bicycle frames are formed from thin or small gauge alloy steel tubing, such as molybdenum or 4130 steel, that form the struts of the frame, to insure that the resulting frame is both light and very strong.

Typically the frame of high quality bicycles arranged in accordance with prior art practices includes the familiar head tube (that mounts the bicycle fork and front wheel assembly), the top tube, the down tube, and the seat tube (that supports the seat), that form the main components of the frame, and which must be connected together in coplanar relation for the alignment that gives the best results. The frame also includes a pair of seat stay tubes and a pair of chain stay tubes, with one of the seat stay tubes and one of the chain stay tubes being connected to one of the rear wheel bearing brackets, commonly known as a drop out, on one side of the central plane of the frame (as defined by the properly coplanar aligned head, top, down, and seat tubes), and the other of the seat stay tubes and the other of the chain stay tubes being connected to the other rear wheel bearing bracket or drop out on the other side of the frame central plane. The bicycle fork mounts the front wheel assembly by way of fork tip ends, each of which is applied to a free end of each fork blade of the bicycle fork, with the fork tips each being similarly slotted to mount the front wheel assembly in the usual and familiar manner. The bicycle frame rear wheel bearing brackets or drop outs are similarly slotted to mount the bicycle rear wheel assembly. The fork tips or ends and the rear wheel bearing brackets in question both have drop out functions insofar as the respective wheel assemblies are concerned, and both will hereinafter be sometimes referred to as "drop outs".

Further, the frame main components of the indicated high quality high performance bicycles are typically secured together by affixing them to lugs or brackets using brazing techniques. Thus, the top tube and the down tube are affixed to the head tube at the top head lug and the bottom head lug, respectively, and the down tube and the seat tube are affixed to the bottom bracket (also known as the bottom bracket shell) that mounts the bicycle pedal crank assembly, to which the forward ends of the chain stay tubes are also affixed, and the top tube and the seat tube are fixed together at the frame seat lug. While the seat stay tubes are conventionally anchored to the frame, either at the seat lug or to the top end of the seat tube, or possibly both, heretofore they have been typically anchored in externally lapping relation to either side of the seat tube exterior and/or in partial lapping relation to the seat lug exterior, prior to the developments disclosed in the application of myself and Robert F. Read, Ser. No. 543,398, filed Oct. 14, 1983, and assigned to the assignee of the present application, which application discusses in detail the long standing practical problems that have been involved in or result from the indicated manner of fixing the upper ends of the seat stay tubes to the frame.

The seat stay tubes at their lower ends and the chain stay tubes at their rear ends, which are disposed in sets on either side of the frame, involve the indicated tube ends, of the respective tube sets, being affixed to the respective rear wheel bearing brackets or drop outs between which the conventional rear wheel assembly is mounted (in the familiar dropout slots formed in the respective drop outs that are provided for that purpose). Each drop out is formed with a tab or flange at the location thereon where the respective ends of the seat and chain stay tubes are to be applied to the dropout, with the dropout tabs or flanges involved being received inside the tube ends.

While the frame front wheel mounting fork assembly is not part of the bicycle frame in and of itself, it is journalled in the frame head tube to mount the front wheel assembly on the frame. Each fork blade of the fork assembly has affixed to same a fork tip or fork end that is formed with a tab or flange for application to the fork blade it is applied to in a manner similar to the way the seat and chain stays are applied to the respective rear drop outs. The fork tips or ends each define the familiar dropout slots that receive the front wheel assembly for journalling same on the frame in the usual manner.

The present invention is concerned with and directed to the securement of the bicycle front and rear wheel bearing brackets or drop outs, in their operative positions on the bicycle. In the case of the front drop outs, the application is to the front wheel mounting assembly fork, while in the case of the rear drop outs, the application is to the bicycle frame itself.

Heretofore, the fork tips that form the front wheel drop outs or bearing brackets, and the rear bearing brackets or or drop outs, have been parts formed from a suitable metal (usually a suitable steel) that is usually forged or stamped to final shape. In the case of the fork tips, the drop out body involved is relatively flat, has the familiar drop out slot formed at one end of same, and the indicated securement tab or flange formed at the other end of same, which is to be inserted into the open end of the fork blade (which is typically tubular) that it is to be secured to, with the end of the fork blade in question being cross notched transversely of same and across the longitudinal center of same to provide for a fitting of the fork tip drop out flange or tab into the fork blade for brazing securement purposes.

The conventional rear drop out for application on each side of the frame is similarly a flattened metal body (usually formed from a suitable steel) that defines the familiar drop out slot in a base portion of same and a pair of flanges or tabs that are angled relative to the slot for application to the frame seat stay tube and the frame chain stay tube that are to be on the same side of the frame as the drop out in question. Here again, the seat stay tube and the chain stay tube ends that are to receive the respective drop out flanges or tabs are cross slotted transversely thereof and at the longitudinal center of same to provide for a fitting of the drop out flange or tab into the stay tube end it is to be applied to, for brazing securement purposes.

Thus, in the case of both the front and rear drop outs, the bracket that forms the drop out is formed with a flange or tab that is to be received in the open end of the tube end to which it is to be applied, with the tube end in question being cross notched across its longitudinal axis to provide for fitting of the drop out flange or tab into and within the tube end involved for brazing of these parts together. It is further to be noted that it is also common practice to drill a vent hole in the side of the tube end in question to vent gases developed during the brazing procedure, as the brazing of these parts together seals off or fully closes the tube end in question and the gases need to be vented as they rapidly expand as they are formed. The vent hole referred to, which also serves to provide an outlet for cleaning chemicals when the frame is later dipped into active chemicals to remove brazing flux, has had to be located in the tubular component involved so that the vent hole cannot be seen on the finished frame when viewed from the sides or ends of the frame. Thus the conventional vent hole referred to has to be carefully located on the frame tubular component in question so that the vent hole is positioned away from the easily or normally seen or observed surfaces of the frame components after the bicycle is ready for display, sales, and use. The vent hole in question must also be located sufficiently from the end of the tube component involved to avoid initiation of crack forming in the tube during brazing and/or filling up of the vent hole during brazing.

When the drop out flange or tab is brazed to the tube end in question, since the drop out flange to be made fast to the tube end in question is disposed within the tube end it is being secured to, the drop out flange cannot be directly heated by the brazing torch; since the tube end shields the drop out flange (to be bonded thereto) the choice is to play the torch on the tube end (which is not done because of the weakening of the tube that results) or the torch flame has to be played on the drop out itself, to heat by conduction the drop out flange or tab, so that the brazed filler material employed can be melted for proper flowing into the open space between the drop out flange or tab and the wall tube in which the drop out flange or tab is received, it being essential that all such space therebetween be filled with the brazed material to avoid pocket formation that will result in a weak joint. The close positioning of the tube end adjacent the portion of the drop out that is being flame heated necessarily results in some heating of the tube end itself and at the indicated cross slot this results in undesirable stress concentrations, in the tube end. The undesirable heating of the tube end that has been needed in order to obtain the full flux melting that is desired, together with the vent hole requirement, can all too frequently result in undesirable weakening of the tube at its end in question, as by either crack formation, hardness reduction, or both.

Furthermore, when the drop out flange or tab is inserted into the tube end to which it is to be applied, and seated within the tube end cross slot for this purpose, these parts are free to rock in several directions somewhat, prior to brazing, which requires that they be carefully fixtured in the relative positions they are to assume in the form in which they are to be bonded together by the brazing operation. Normal forging or stamping tolerances, normal machining tolerances for eliminating the flashing that results from forging or stamping, and normal brazing tolerances, in combination, all too frequently result in a misalignment of the brazed together parts at the joint indicated, with cold setting (and its undesirable stressing and possible cracking or rupture) being required to place the drop out in position for proper orientation relative to the other bicycle components involved for effective tracking that is desired for high performance bicycles.

In this connection, the fork tip defining drop outs as a pair, and the rear wheel drop outs, as a pair, must be disposed so that the wheel assembly receiving slots the respective drop out pairs define are parallel, and the drop outs involved at each location must also be properly oriented relative to the frame components they are brazed to for maximized joint strength as well as disposing the respective wheel assemblies for proper tracking of the bicycle involved. As to the rear drop outs, each drop out defines a planar face at each side of the drop out that borders the drop out mounting slot along its length from the slot open end, and in the assembled drop out pair, the drop out faces that face each other (the inside faces) nut be parallel in order to maintain a constant space therebetween that is just slightly over the spacing of the surfaces of the rear wheel axle adjusting nuts that are to engage same.

The extensive fixturing that heretofore has been required to braze the front and rear drop outs to the bicycle components that are made fast to inevitably results in considerable heat sinks that extend brazing times and increase the risk of flux exhaustion at the joint being worked on, which can result in an unwetting of the parts involved that will defeat acceptable brazing When the brazing of the joint involved at the respective drop outs is completed, prior practices have required that after the brazing flux is removed, the joints involved require a considerable amount of machining, including grinding, filing, and sanding, to blend the brazed parts into an aesthetically pleasing surfacing that smoothly joins the respective drop outs involved and the tube end to which the respective drop outs are connected. This, of course, adds to the cost of producing the frames, and the machining procedures involved require care and experience on the part of the craftsman to insure that the result is aesthetically pleasing without weakening the joint or other parts involved.

A principal object of the present invention is to provide new front and rear wheel drop out arrangements for high performance high quality type bicycles that provides for socket fitting of the tube member end, to which the drop out is to be secured, within the drop out, that eliminates the need to form a vent hole in the tube involved, and is arranged to permit the escape of gases formed during brazing, and the draining of the cleaning chemicals, through the drop out, that exposes for direct heating by the brazing torch the part of the drop out that is to be bonded to the tube end in question, and that permits the drop outs to be formed by employing investment casting techniques by which such components can be accurately made to define the desired shapes to very close tolerances.

Another principal object of the invention is to provide new front and rear wheel drop out arrangements for high performance high quality type bicycles in which the brazed joint that mounts the drop out in place, after completion, requires no machining to present a pleasing and attractive appearance.

Yet another principal object of the invention is to provide new front and rear drop out arrangements for high performance high quality type bicycles that results in joinder of the drop outs to the tubular bicycle components involved with a joint of improved strength having minimized brazed filler metal and torch heating requirements.

Still another principal object of the invention is to provide a front wheel assembly drop out arrangement in which the fork tips that comprise the drop outs are readily bonded in place with minimum fixturing to insure that the wheel assembly receiving slots thereof are properly aligned and oriented.

Still a further principal object of the invention is to provide a rear wheel assembly drop out arrangement for high performance high quality type bicycles that insures ready fixing of the respective drop outs to the rear ends of the frame seat and chain stay tubes with proper alignment when the brazing cycle is completed, for completion of the frame so that all of its components are properly aligned for proper tracking, without having to cold form any of the joints at the rear drop outs, that permits the tubes that are to form the frame seat and chain stays to be cut to predetermined lengths that require no modification in length to complete the frame assembly, and that, where a derailleur is to be involved (as where the bicycle is to be of the multigeared type), eliminates the need for mounting a derailleur cable housing stop on the frame right side chain stay, as well as the need to shape such chain stay by grinding to permit application and removal of the rear wheel assembly from the frame free of interference with the rear wheel assembly multi geared sprockets.

Yet other objects of the invention are to provide bicycle frame front and rear drop out arrangements that are especially suited for high performance high quality bicycles for permitting accurate assembly of the drop outs to the tubes they are to be fixed to, without extensive fixturing, that insures total processing time required to assembly and finish the frame including its front wheel assembly fork is minimized, while providing a frame of increased strength and less weight, and that provides a bicycle frame that is economical of manufacture, structurally sound throughout, and long lived and efficient in use.

In accordance with the invention, a basic bicycle wheel drop out bracket, or drop out, is provided, which for both the front and rear drop outs generally comprises a generally flat body formed by employing suitable investment casting procedures to define opposed side walls that define opposed face surfacings of the body that are coextensive with and define a generally planar plate portion of the body which is shaped to define the familiar drop out slots that extends from an open end of the slot across the thickness of the body plate portion. The body plate portion further defines a relatively narrow marginal edging that connects the indicated side walls along thr perimeter of the body plate portion that is interrupted at the slot open end.

The drop out defining body is formed to define a rounded stub portion that is substantially aligned with and projects away from the body planar plate portion, which stub portion defines a socket end portion forming an imperforate side wall structure of rounded configuration in circumambient relation thereabout and that is in substantially squared relation to a substantially flat socket floor that extends crosswise of the plane of the drop out body plate portion. The indicated stub portion side wall structure defines an external shoulder projecting laterally of at least one of the body opposed side walls, and the drop out body is formed to define a vent passage that is to vent the bore of the tubular member it is to be bonded to through the drop out stub portion floor. The drop out stub portion side wall structure is further shaped to define a flange type projection extending longitudinally of the axis of, and away from, the socketed end portion for overlapping relation with the tube end that is to be received in same for lapped joint brazing of the tube end to the drop out body involved.

The drop out defined vent passage preferably extends through the drop out body to its wheel mounting slot, though alternately the drop out defined venting passage vents through the floor of the socketed end portion to the drop out shoulder, and thus to one side of the drop out body, where the drop out configuration makes this desirable, as for the right side rear drop out for multigeared bicycles that will involve a derailleur.

The specific adaptation of the drop outs of this invention for shaping using the investment casing procedure eliminate the problem causing flashing that results from stamping or forging of such components and permits ready shaping of any particular drop out, as best suits the drop out mounting and orienting situation in light of the particular position that a particular drop out is to have as mounted in the bicycle.

Further in accordance with the invention, the tubular member that is to be bonded to the drop out in question has the end of the tubular member squared off for flush application to the drop out socketed end portion floor. The drop out stub portion socketed end side wall structure and the external surfacing of the tubular member end in question are proportioned for close fitting relation of the tubular member end within the drop out stub portion socketed portion so that during the brazing procedure when brazing temperature is reached, the brazing filler metal quickly flows around the entire joint area because of the capillary attraction, and thus minimizing brazing filler material needs. Further, the finished surface features of the drop out and its connection to the tubular member in question are in effect cast into the part and no machining is required for blending of the brazing filler metal (usually brass) and steel materials involved at the joint as might be otherwise needed for aesthetic purposes.

As to the fork tip version of the drop out arrangement, the fork tip body stub portion, and namely its socketed end portion, closely receives the end of the fork blade that is to be bonded to same with the indicated close fitting relation indicated and the lapping type of brazed joint which is provided by both the stub portion socketed end, its side wall, and the flange that projects from same. The side wall structure of the drop out stub portion is round in configuration and is substantially centered on the drop out body plate portion to define in each of the body side walls an external shoulder projecting laterally of the body plate portion, with the stub portion side wall structure in each case defining over one of the shoulders thereof the indicated flange projecting outwardly of and parallel to the stub end portion defined by same for lapping connection to the tube end to be received in the stub portion socketed end. The drop out venting passage vents through the drop out body to the wheel assembly mounting slot so that the gases caused by brazing these components together are vented through the open end of the tubular member involved, through the drop out body, and exit at the drop out slot in question. During cleaning of the fluxes, the liquid chemicals involved also exit at the same vent opening. The bicycle fork prior to its assembly to the frame can have its front drop out defining fork tips brazed to the respective fork blades thereof in proper orientation and allignment with minimal fixturing and brazing to provide a fork assembly of minimized weight and maximized strength in the area of the fork blades.

As to the rear drop outs, each drop out comprises the generally flat body defining opposed side wills that define opposed face surfacings of the body that are coextensive with and define the generally planar plate portion of the body which is shaped to deform the drop out slot that extends from an open end of the slot across the thickness of the body portion to form a bicycle wheel axle mounting way in the drop out body that extends crosswise of same.

The rear drop out body plate portion further defines a relatively narrow marginal edging that connects the body side walls along the perimeter of the body that is interrupted by the slot open end. The rear drop out body is further shaped to define first and second rounded stub portions that are substantially aligned with and that project away from the body planar plate portion, with each stub portion defining a socketed end portion that is similar to that of the front drop outs, and forms an imperforate side wall structure in circumambient relation thereabout that is in substantially squared relation with a substantially flat socket floor that extends crosswise of the plane of the rear drop out body plate portion. The side wall structures of the rear drop out stub portions are round in configuration and are substantially centered on the drop out body plate portion to define on each of the body side wall structures an external shoulder projecting laterally of the body plate portion, with the stub portion side wall structures in each case defining over one of the shoulders thereof a flange projecting outwardly of and parallel to the stub end portion defined by same for lapping brazed connection to the tube end to be received in the stub portion socketed end.

The rear drop out bodies are formed to define a vent passage for each of the drop out stub portions that vents through the respective stub portion floors. The right hand drop out body is arranged to have its respective stub portions oriented and angled for application thereto of the rear ends of the right hand seat stay and chain stay tubes, while the left hand drop out body has its respective stub portions similarly oriented to receive the end portions of the seat stay and chain tubes that are to be applied to the left hand side of the frame.

The vent passages of the drop out that is to be on the right hand side of the frame extend through the body of the drop out to the rear wheel mounting slot thereof, except that where the bicycle is to be of the multi speed, multi geared type utilizing a derailleur, the vent passage of the seat tube stay receiving stub end portion vents through the stub end portion shoulder, with such vent passage being proportioned to receive the derailleur cable and serve as the derailleur cable housing stop. This eliminates the need for application of a separate derailleur stop to the right hand chain stay tube (as is conventional). The stud portion of the right hand drop out body is shaped, in the case of the multi speed multi geared bicycle, to provide adequate clearance for the rear wheel assembly sprockets when the rear wheel assemby is applied to and moved from the frame, without having to machine and thus weaken the right hand chain stay tube involved.

As to the rear drop out that is to be at the left hand side of the frame, the venting passage of each stub portion vents through the drop out body to the rear wheel axle mounting slot thereof.

Other objects, uses, and advantages will be obvious or become apparent from a consideration of the following detailed description and the application drawings in which like reference numerals indicate like parts throughout the several views.

In the drawings:

FIG. 1 is a side elevational view of a bicycle frame arranged in accordance with the invention, with the frame front wheel mounting fork assembly being shown in its operating position, but with the bicycle handle bar assembly, front and rear brake assemblies, the pedal and chain drive assembly, the seat and seat post, and other conventional equipment omitted, except for a fragmental showing of a derailleur operating cable as it is to be applied to the frame right hand chain stay tube in accordance with the invention;

FIG. 2 is a fragmental perspective view of the bicycle fork blades at their lower ends showing the fork tip drop outs of the present invention applied thereto, with the front drop outs involved being viewed from a position forwardly of and on the right hand side of the frame (the frames right hand side);

FIG. 3 is similar to that of FIG. 2, but illustrates in phantom the central portion of the front wheel assembly as applied to the fork tip defining drop outs;

FIG. 3A is a side elevational view, on an enlarged scale, of the bicycle left hand fork tip defining drop out of FIGS. 2 and 3, as viewed from the frame's own left hand side;

FIG. 4 is a side elevational view, on an enlarged scale, of the bicycle right hand fork tip defining drop out of FIGS. 2 and 3, as viewed from the frame's own right hand side (and thus is a larger scale view of such fork tip as viewed in FIG. 1;

FIG. 5 is a plan view of the drop out shown in FIG. 4 viewed as indicated along line 5—5 of FIG. 4;

FIG. 6 is a perspective view of the rear drop outs of the bicycle frame as secured to the respective frame seat stays and chain stays, with the rear drop outs involved being viewed from a position to the rear and somewhat above the rear drop outs as viewed in FIG. 1, and to the frame's own right hand side;

FIG. 7 is a view similar to that of FIG. 6, but illustrating the central portion of the rear wheel assembly applied to the rear drop out slots in operative relation thereto, showing also in phantom the operative position of a derailleur mechanism that is representative of the type employed with multi speed multi geared bicycles;

FIG. 8 is an elevational view, on an enlarged scale, of the frame's right hand rear drop out shown in FIGS. 6 and 7;

FIG. 9 is a plan view, partially in section, of the rear drop out shown in FIG. 8, taken substantially along line 9—9 of FIG. 8;

FIG. 10 is a fragmental elevational view of the chain stay receiving stub socketed end portion of the drop out FIG. 8, taken substantially along line 10—10 of FIG. 8;

FIG. 11 is a cross-sectional view through the drop out shown in FIG. 8, taken substantially along line 11—11 of FIG. 8;

FIG. 12 is a cross-sectional view of the drop out shown in FIG. 8, taken substantially along line 12—12 of FIG. 8, better illustrating the vent passage defined by this embodiment of the invention, for the drop out stub defined socketed end portion that is to receive the frame seat stay tube involved;

FIG. 13 is a side elevational view of the frame's left rear drop out, taken from the left hand side of the frame (and thus the back side of FIG. 1);

FIG. 14 is a view of a rear drop out that is of simplified arrangement suitable for the common one speed track bicycle; and, FIG. 15 is a view similar to that of FIG. 10, but taken along line 15—15 of FIG. 14.

However, it is to be distinctly understood that the specific drawing illustrations provided are supplied primarily to comply with the requirements of the Patent Laws, and that the invention is susceptible of modifications and variations that will be obvious to those skilled in the art, which are intended to be covered by the appended claims.

GENERAL DESCRIPTION

Reference numeral 10 of FIG. 1 generally indicates the improved bicycle frame to which the invention is applied, and it will be observed that the frame 10 is of the classical diamond shaped frame commonly employed in high performance high quality bicycles, which comprises head tube 12, top tube 14, down tube 16 and seat tube 18, that form the main strut components of the frame 10. Also associated with the frame 10 are the rearwardly located pair of laterally spaced apart seat stay tubes 22 and 24, and the pair 26 of laterally spaced apart chain stay tubes 28 and 30.

The frame 10 strut components are tubular in nature and are joined together by lugs and brackets to have the diamond shape indicated, with reference numeral 32 indicating the top head lug, reference numeral 34 indicating the bottom head lug, reference numeral 36 indicating the seat lug that is preferably arranged in accordance with said application Ser. No. 543.309. reference numeral 38 indicating the bottom bracket, also known as the bottom bracket shell, that receives the bicycle foot pedal type crank assembly that is not shown, and reference numeral 40 indicating a pair of rear wheel bearing brackets or drop outs 42 and 44, between which is applied the conventional bicycle rear wheel assembly that is not shown. The seat stay tube 22, the chain stay tube 28, and the drop out 42 they are secured to form a first seat stay-chain stay subassembly 43 on one side of the frame 10, while the seat stay tube 24, the chain stay tube 30, and the drop out 44 they are secured to form a second seat stay-chain stay subassembly 45 on the other side of the frame 10. The subassembly 43 is on the right hand side of the frame, while the subassembly 45 is on the left hand side of the frame, with the specific drop out 42 illustrated in FIGS. 1 and 6–12 being arranged for application thereto of a conventional derailleur that is shown in phantom at 47 in FIG. 7, which is operated by the familiar cable 48 that is passed about the lower exterior of the bottom bracket 38 and extends to a conventional operating lever that is not illustrated (as that structure forms no part of the present invention).

The head tube 12 journals in any conventional manner the front wheel mounting fork assembly 46, which comprises the usual fork 49 that defines the familiar spaced apart fork blades 50 and 52. In accordance with the present invention, the fork right hand blade 50 has applied to its lower end 54 fork tip or front wheel drop out 56, while the left hand fork blade 52 has applied to its lower end 58 the fork tip or front wheel drop out 60. Front wheel drop outs 56 and 60 form a pair 61 of such drop outs.

The drop out 56 and the tube defining the fork blade 50, the drop out 60 and the tube defining the fork blade 58, and the drop outs and stay tubes of subassemblies 43 and 45 are arranged in accordance with the present invention and are described in detail hereinafter.

As is well known in the art, frames for high quality high performance bicycles comprise tubing or tubular strut defining components of the type illustrated which are made from steel alloy tubing of a very thin or small gauge, for maximized strength and minimized weight. For instance, the tubing components illustrated for frame 10 are preferably formed from a steel alloy of 65,000–155,000 psi. tensile strength, such as for example 4130 molybdenum steel alloy having a gauge of 21-24. Experience has shown that the best way to join such tubing components together in a frame 10 is to employ brazing techniques, as brazing requires substantially less heat than welding; further, the strength of the thin light weight heat treated tubing walls is reduced by exposure to excessive heat.

Experience has also shown that the strongest brazed joints available for making frames of the type indicated are best provided or accomplished by lapping the structures involved at the joints so that one surface overlaps the adjoining surface of the component being mounted thereto, with a brazing metal, such as brass or a suitable silver alloy being melted between the overlapping surfaces; when the brazing material solidifies, the bond is very strong. For this purpose bicycle frame lugs and brackets for high speed high quality bicycle frames have evolved for providing the overlapping surfaces involved that in turn provide the bonding surface areas desired for effective brazing.

In the frame 10 that is illustrated in FIG. 1, the top head lug 32 defines a collar portion 51 that is received over the head tube upper end, and the socket portion 57 that receives the forward end 58 of the top tube 14. The bottom head lug 34 comprises a collar portion 61 that receives a lower end of the head tube 12, and that defines socket portion 63 that receives the forward or upper end 68 of the down tube 16. Seat lug 36 defines socket portion 64 that receives the rear end 66 of the top tube 14, and socket portion 67 that receives the upper end 68 of the seat tube 12. The seat lug 36 is fully disclosed in said application Ser. No. 543,398, and as disclosed the seat lug 36 is apertured to receive the seat post through a bore that is not shown at the top of lug 36.

As disclosed in said application Ser. No. 543,398, the seat lug 36 is formed to define a pair of rearwardly extending downwardly inclined arms or studs to which the upper ends of the chain stay tubes 22 and 24 are applied. In the showing of FIG. 1, the indicated arm at the bicycle frame right hand side of the seat lug is indicated by reference numeral 70 and the upper ends of the seat stays 22 and 24 are represented by reference numerals 72 and 74, respectively. The end portions of the seat lug arms or studs represented by arm 70 are socketed to closely receive the upper ends 72 and 74 of the respective seat stay tubes for brazing same in fixed relation to the seat lug 36. The seat lug 36 is also formed with a vertical slot between the respective seat stay receiving socketed end arms, with the upper end of the seat tube 12 being correspondingly slotted, and with the post of the seat being clamped in its desired operating position by screw threaded fastening device 76 of any suitable type applied between the seat or arms 70, as disclosed in said application Ser. No. 543,398.

The bottom bracket 38 conventionally defines socket 90 that receives the lower end of the down tube 16, a socket 94 that receives the lower end 96 of the seat tube 18, and a pair of spaced apart sockets 98 on either side of same that respectively receive the forward extending ends 100 of the respective chain stay tubes 28 and 30.

In accordance with the present invention, the rear drop outs 42 and 44 that are disposed on the respective sides of the frame position that the bicycle rear wheel is to occupy, are applied to the rearwardly extending ends 102 of the respective seat stay tubes 22 and 24, and to the rearwardly extending ends 104 of the respective chain stay tubes 28 and 30 to provide the mounting arrangement for the bicycle rear wheel assembly that is not shown.

Conventionally, the front wheel mounting drop outs (that are to form the fork tips of the bicycle), and the rear drop outs of the bicycle, are generally forged or stamped from a steel suitable for cold forming and machining. These conventional drop outs are each formed with tabs or flanges that are to be received within the tubes of the bicycle components they are to be fixed to. Thus, in the case of the conventional fork tips, the individual drop outs are each formed with a single tab or flange that is to be received within the end of the fork blade (that the fork tip is to be secured to), with the fork blades each being cross slotted at such ends, at the longitudinal center of same, to provide an appropriate fit for the drop outs involved. The rear drop outs are similarly formed with tabs or flanges that are to be received within the stay ends to be joined to same with such stay ends also being similarly cross slotted. The drop outs are made fast to the tubular components they are to be secured to by brazing, which involves heating of the drop outs to a sufficient temperature with the brazing torch to melt the brazing filler material that is to bond the drop outs to the tubular components involved.

An important factor involved in the assembly of any frame that is to be employed for high quality high performance bicycles has to do with the alignment of the frame so that the bicycle will properly track when ridden. For this purpose, the top, down, head and seat tubes must be joined in coplanar relation, so that they are coplanar in the central plane that bisects the frame, in this case the frame 10. The front wheel fork as mounted in its operative position journals the fork for rotation about the axial center of the head tube 12, with the fork blades being oriented so that they are disposed equidistantly from the pivotal axis of the fork.

The seat stay tubes 22 and 24, and the chain stay tubes 28 and 30, on the other hand, as already indicated, are respectively disposed on either side of such central plane, with a seat stay tube 22 and a chain stay tube 28 being associated with the drop out on the right hand side of the frame, and the other seat stay tube 24 and the other chain stay tube 30 being associated with the drop out on the left hand side of the central plane. The subassemblies 43 and 45 that respectively include the respective rear wheel drop outs are oriented and configured to dispose the rear drop outs equally spaced to either side of such central frame. Further, the seat stay tubes 22 and 24 are in coplanar relation with a cross plane that is rearwardly and downwardly angled, and extends normally of said central plane, and the chain stay tubes 28 and 30 are in coplanar relation with a second cross plane that is rearwardly directed and also extends normally of such central plane, as is well known in the art.

As has been referred to hereinbefore, in addition to conventional the cross notching or slotting of the tube ends to which the respective drop outs are to be bonded, the tubular components involved adjacent the location of the drop outs are conventionally formed with a vent opening that is to vent the gases formed during brazing as well as form a drain opening for cleaning chemicals when the frame is treated to free it of brazing flux. These vent openings have to be carefully located so that they cannot be seen when the bicycle frame is viewed from its sides or either end of same (for aesthetic considerations), and the vent hole involved must be located sufficiently from the ends of the tube to avoid initiation of cracks forming in the tube during brazing and filling up of the vent hole during brazing.

Normally the fork 49 has its fork tips applied thereto before the fork is applied to the head tube 12, and the conventional subassemblies 43 and 45 including the conventional rear drop outs are formed prior to the application of such subassemblies to seat lug 36 and the bottom bracket 38 in the form that the latter are assembled with assembled frame tubes 12, 14, 16 and 18. Nevertheless, the fit of the conventional front and rear drop outs and their flanges or tabs within the cross slotted ends of the tubular members they are to be brazed to is anything but self locating as the components involved can freely rock in several directions. Consequently these components have to be carefully fixtured to braze them together with the relationship and orientation that will provide a properly oriented frame 10 and fork 49 therefor including the location of the respective front and rear drop outs relative to the bicycle frame central plane that has been aforereferred to.

THE IMPROVED FRONT AND REAR DROP OUTS

Referring now more specifically to FIGS. 2-5, the front drop outs 56 and 60 are substantially identical with the exception that the drop out 56 is for the bicycle right hand side of fork 49 while the drop out 60 is for the bicycle left hand side of fork 49. The drop out 56 will be described in detail and it is to be understood that the drop out 60 has similar structural features that are indicated by corresponding reference numerals having the suffix A (see FIGS. 2, 3 and 3A).

Drop out 56 comprises a generally flat body 120 defining opposed side walls 122 and 124 (see FIG. 5)

that define opposed face surfacings 126 and 128 that are coextensive with and define a generally planar plate portion 130 of the body 120. The body 120, which forms the drop out 56 and replaces the conventional fork tip or fork end, is shaped to define the conventional drop out slot 132 that for the body 120 is in the form of spaced parallel slot surfacings 134 and 136 that merge with the curvilinear surfacing 138 at the closed end of the slot 132 which is struck on a radius that is equal to one half the width of the slot 132. The slot 132 is thus generally rectilinear from its open end 140 inwardly thereof to the curvilinear surfacing 138 and in the form shown is angled at approximately 6 degrees with respect to the longitudinal axis 142 of the body 120. Body 120 is shown beveled at the slot open end 140, as is conventional.

The plate portion 130 of the body 120 defines a relatively narrow marginal edging 144 that connects the side walls 122 and 124 along the perimeter of the body plate portion 130 except where the edging 144 is interrupted by the slot open end 140.

The drop out body 120 is further formed to define a stub portion 146 defining a socketed outwardly projecting end portion 148 in the form of an imperforate side wall structure 150 that is in circumambient relation about the stub portion end portion 148. The side wall structure 150 is in the form of a continuous side wall 152 that is in squared relation with the end portion floor 154 that is of flat or planar configuration and that where the drop out 56 extends normally of the plane of the body 120 and its longitudinal axis 142. The floor 154 forms planar outwardly facing, depressed surface 155 that together with the side wall 152 forms socket 156 in which, in accordance with the invention, the terminal end portion 160 of the fork blade 50 is received.

As indicated in FIGS. 2-5, the stub portion 146 is generally curvilinear in configuration transversely of body 120 and forms a pair of external shoulders 162 with the body plate portion 130, the side surfacings 126 and 128 being shaped in diverging relation on either side of the body plate portion 130 to merge with the external cylindrical wall surfacing 168 of the side wall 152.

As shown in FIG. 2, the side wall 152 of the body 120 is formed to define projecting flange portion 170 that has the same arcing about the body axis 142 that side wall 152 has. The flange 170 of drop out 56 and the corresponding flange 170A of drop out 60 are located on the sides of these components that face outwardly of or away from the frame 10.

In accordance with the invention, the drop out body socket 156 (of drop out 56) is proportioned to closely receive the terminal end portion 160 of the fork blade 50 with the tolerance that is normally provided for brazing pass operations, it being contemplated that the fork blade 50 be cylindrical at its terminal end portion 160 and be brazed in place within socket 156. The tolerance involved lies in the range of from approximately 0.002 inch to approximately 0.005 inch for providing the desired capillary flow of the brazing material when it is liquified during the brazing cycle for fixing the drop out 56 to the fork plate 50. The drop out body socket of drop out 60 and the end portion 160A of blade 52 are similarly arranged and proportioned.

In this connection, as indicated in FIGS. 3A and 4, the fork blades 50 and 52 conventionally are of the thin walled tubular configuration that is commonly employed for high quality high performance bicycle frames and forks, with the fork blades in question generally comprising encompassing side wall 172 and bore 174. The blades at their upper ends have the conventional elliptical transverse cross-sectional configuration, with the fork blade side wall 172 being apertured as is conventional adjacent the fork blade upper end for air flow purposes.

Further in accordance with the invention, prior to applying the tubular member represented by the fork blade 50 to the drop out body 120, the blade 50 has terminal end portion 160 shaped to define terminus 176 that is in squared relation with the longitudinal axis of the fork blade 50, which, when the blade 50 is affixed to the body 120, is coaxial with the axis 142 of the body 120.

The drop out 60, as already indicated, is the same as drop out 56, as indicated by corresponding reference numerals with the suffix A, except that the projecting flange portion 170A of same is located 180 degrees about wall 152 so that the flange portions 170 and 170A are disposed to face outwardly of the bicycle as the fork 49 is applied to frame 10 in the particular frame arrangement shown in FIG. 1. The blade 52 is similarly formed to define terminus 176A that is in squared relation with the longitudinal axis of blade 52, and thus the longitudinal axis of blade 52 is coaxial with axis 142A of body 120A.

The body 120 along slot 132, except that its end portion 140, and on either side of the body 120, is formed to define planar surfacings 135 and 137 that are of the conventional type provided for close fitting relation with conventional components of the front wheel assembly.

An important feature of the invention is that the drop out body sockets 156 and 156A of the respective drop outs 56 and 60 are vented through the floors 155 and 155A, respectively, to vent from within the blade bores 174 brazing gases formed during brazing. For the drop outs 56 and 60, the venting takes the form of the respective elongate venting passages 175 and 175A that extend from the venting ports 177, 177A (respectively) at the respective floors 155, 155A, through the bodies of the respective drop outs 56, 60, to their respective slots 132, 132A, at the venting exits ports 179, 179A (respectively). This venting of the drop outs 56 and 60 takes advantage of the open terminal ends 160, 160A of the blades 50, 52 through which brazing gases can pass during brazing, and avoids the problems previously encountered with the heretofore required need to form a vent opening in the side walls 172, 172A of the blades 50, 52.

The fork assembly 46 has the drop outs 56 and 60 applied thereto prior to application of the fork assembly 46 to the frame 10. For application of the drop outs 56 and 60 to the respective fork blades 50 and 52, the fork 49, of course, is a fork shaped member defining the blades 50 and 52, and the blades 50 and 52 are processed to define the respective terminal end portions 160 and 160A and their squared terminals 176 and 176A as part of the preprocessing of the fork 49 for application thereto of the drop outs 56 and 60.

Thereafter, the fork 49 and a pair 61 of the drop outs 56 and 60 are suitably fixtured to dispose the blades 50 and 52 together with their associated drop outs 56 and 60 in the manner indicated in FIGS. 1, 2, 3A and 4, so as to position the slots 132 and 132A defined by the respective bodies 120 and 120A in parallelism, with the terminals 176 and 176A of the respective fork blade terminal end portions 160 seated flush against the respective floor surfaces 155 and 155A of the sockets 156 and 156A defined by the respective bodies 120 and 120A. Such fixturing preferably disposes the bodies 120 and 120A and their respective blades 50 and 52 in an upright position in which the fork 49 is substantially vertically disposed.

Thereupon, a brazing cycle is applied to the respective drop outs 56 and 58, in accordance with which a manually or machine operated brazing torch is ignited and the flame directed only at the stub portion 146 and 146A of the respective drop outs 56 and 60, to the exclusion of the fork blades 50 and 52, with the portions of the latter seated in the respective sockets 156 and 156A being heated by conduction as needed to achieve brazing temperatures. At the appropriate time, brazing wire of a suitable type, for instance, brazing wire of an appropriate size (for instance having a diameter of 0.062 inch) is mechanically or manually fed into the confined spacing between the tubular member ends represented by the fork blade terminal end portions 160 and 160A and the drop out side walls 152 and 152A that define the respective sockets 156 and 156A, with the brazing wire liquifying as it is fed into place, with the result that the brazing material under the capillary flow action involved penetrates into and throughout the entire spacing between the tubular member terminal end portions 160 and 160A and the body stub portions 146 and 146A and the inside surfacing 153 of the side walls 152 and 152A. In this connection, the flanging provided by the respective stub portions 146 and 146A, as represented by the flanges 170 and 170A, provide additional overlapping of the drop out socketed end portion wall structures to increase the strength of the joint that is defined by the brazing material between the drop out socketed end portion surfaces involved and the tubular member side surfaces that are received within the respective sockets 156 and 156A. The braze filler metal is confined to the space between the respective blade tubular member ends and the drop out side walls that define the respective drop out sockets so that the hardened braze filler metal is confined to such spacing and smoothly conforms where it is exposed at the sockets to the shaping of the drop out and blade components involved, eliminating the need to machine in these areas for aesthetic reasons.

Alternately the braze may be applied in the form of a preformed brazing wire inserted in place in the confined spacing between the tubular member ends involved and the drop out side walls 152 and 152A, prior to applying brazing heat, which permits the use of a fully automatic brazing cycle without requiring use of wire feeders (that can be troublesome in use). The liquifying and capillary flow action of the preinserted brazing wire is similar to that described, except that the braze wire needed is wholly in place when the brazing cycle is initiated.

The brazing gases that are formed within the bores 174 of the fork plates 50 and 52, which expand rapidly, are discharged from within such bores through the respective drop out body longitudinally extending passages 175, 175A, that, in the case of the drop outs 56 and 60, extends between the floor 154, 154A of the respective sockets 156 and 156A through the respective drop out bodies involved and opens into the respective slots 132 and 132A at exit or discharge ports 179, 197A, as indicated in FIGS. 2-4.

When the fork assembly 40 is later dipped in the usual cleaning chemicals to clean off and out the brazing flux, the liquids involved exit the bores of the forks through the respective vent passages 175 and 175A of the respective drop outs 56 and 60.

It will thus be observed that the conventional venting aperture or opening that heretofore has been required to be first formed in the lower ends of blades 50 and 52 prior to application thereto of the conventional fork tips, is completely eliminated along with the defacing and tube weakening problems such apertures cause, as well as the possibility that such venting opening in the fork side wall might be blocked or sealed by the braze filler metal during brazing.

Referring now to the showing of FIGS. 6-15 illustrating the rear drop outs 42 and 44, the drop out 42 will be specifically described in detail, with the understanding that the drop out 44 is substantially identical to same, as will be indicated by corresponding reference numerals with the suffix A indicating similar parts, except for several particulars which will be pointed out in detail as the disclosure proceeds.

The drop outs 42 and 44 are shaped and arranged for right hand and left hand application to the bicycle frame as part of the respective seat stay-chain stay subassemblies 43 and 44, respectively, with the particular drop out 42 that is shown being arranged for application thereto of any suitable form of derailleur where the drop out 42 is to be applied to multi speed multi geared bicycles. As indicated in FIGS. 7 and 9, the drop out 42 includes specific improvements intended for use with derailleur equipped bicycles. The modified drop out 42B of FIGS. 14 and 15 is for use with frames for single speed bicycles, such as the common track bicycle.

The drop out 42 comprises generally flat body 200 defining opposed side walls 202 and 204 forming opposed face surfacings 206 and 208 that are coextensive with and define a generally planar plate portion 210 of the body 200. The body 200 in said plate portion 210 thereof defines drop out slot 212 which in the form illustrated is defined by the rectilinear planar surfacings 214 and 216 that merge into curvilinear surfacing 218 at the closed end of the slot 212, with the respective surfaces 214 and 216 terminating at the open end 220 of the slot. The slot 212 is thus rectilinear in configuration, with the curvilinear surface 218 being struck about radius that is equal to one half the width of the slot 212.

The body plate portion 210 of the body 10 defines a relatively narrow marginal edging 222 that connects the body side walls 202 and 204 along the perimeter of the body plate portion except where interrupted by the open end 220 of slot 212.

The body 200 further defines two stub portions 230 and 232 that are to serve functions similar to the stub portions 146 and 146A of the front drop outs 56 and 60.

As indicated in FIGS. 6, 7 and 8, in the seat stay-chain stay subassembly 43 the body stub portion 230 is to be brazed bonded to the seat stay 22, while the stub portion 232 is to be brazed bonded to the chain stay 28.

The stub portion 230 defines a socketed end portion 234 comprising an imperforate side wall structure 236 that is in circumambient relation thereabout and that is in the form of side wall 238 that is in squared relation with the socketed end portion floor 240 which defines a substantially planar outwardly facing surfacing 242. The side wall structure 236 and its floor 240 define open ended socket 244 that extends rectilinearly of the stub portion 230 away from the plate portion 210 of body 200 and from slot 212. As indicated in FIG. 12, the socket 244 is preferably angled a few degrees off full coplanar relation with the body plate portion 210, for instance 6 degrees in a commercial embodiment, to reflect the orientation that the lower portion of the seat stay 22 is to have with respect to the bicycle frame 10 when the bicycle frame is fully assembled.

As indicated at FIGS. 6–8, the socketed end portion side wall 238 is further formed to define projecting flange portion 248 that has the same arcing as the side wall 238 and extends longitudinally of the socket 244 for close overlying relation with the seat stay 22.

As indicated in FIGS. 8 and 12, the seat stay 22 is of the conventional tubular configuration defining side wall 250 and bore 222. The seat stay 22 is cut to the exact length required for its socketed end application to the seat lug 36 in accordance with said application, and at its end 102 for application to the drop out 42, with the seat stay 22 thus being shaped to define terminal end portion 260 having a terminus 262 that is squared off with respect to the longitudinal central axis of the stay 22, which, when the stay is brazed to the drop out 42, is in coaxial relation with the longitudinal center axis 264 of the socket 244.

Further in accordance with the invention, the body 200 is formed to define vent passage 266 therethrough, which extends from vent opening 268 at the socket 244 to slot 212 at discharge opening 270.

As to the stub portion 232, it defines socketed end portion 280 comprising imperforate side wall structure 282 in the form of side wall 284 that is in squared relation with the planar floor 285 (defining planar floor surface 287) of the stub portion 232 to define socket 286 to which the end 104 of the seat stay 22 is affixed by brazing. The chain stay 28 is likewise of tubular configuration defining bore 289 and side wall 290 that is to have its terminal end portion 292 seated within the socket 286; seat stay end 104 is likewise formed with terminus 294 that is in squared relation with the longitudinal axis 296 of the seat stay 28, which longitudinal axis 296 is coxial with the longitudinal axis of the socket 286 when the latter is seated therein flush against the socket floor 284.

The side wall 284 of the stub portion 280 is formed to define flange portion 298, which has the same arcing as said wall 284 and is to overlie the external surfacing of the side wall 290 of stay 28.

The stub portion 280 also defines a vent passage therethrough, and in the form illustrated for drop out 42, the vent passage 300 of the stub portion 280 is disposed to the outwardly facing side of the stub portion to define a vent opening 302 that is adjacent the stub portion side wall 284, and a vent passage discharge opening 304 that exits at the body stub portion 280 on the outside facing surfacing 206 of same.

As indicated in FIGS. 8, 9 and 12, the stub portion 230 defines external shoulders 310 and 312 on either side of the body 200, while the stub portion 280 defines external shoulders 314 and 316 on either side of the body 200. In the particular drop out 42 that is illustrated in FIGS. 8–12, the stub portion 280 is disposed to be displaced outwardly of the bicycle the proportioning indicated, and inclines somewhat with respect to the body plate portion 210, so as to angle the socket 286 approximately 4 degrees off coplanar relation with the body plate portion 210, to dispose the rear end 104 of the chain stay 28 in its desired somewhat angled relation with respect to the drop out 42 that is suggested in FIG. 9. The vent passage discharge opening 304 is at shoulder 316.

The body 200 of the drop out 42 is further formed to define the opposing planar surfaces 320 and 322 that border the slot 212 and that are interrupted by the slot open end 220. In accordance with the present invention, the surfaces 320 and 322 are formed to converge slightly in the direction of the open end 220 and the slot 212 (see FIG. 11), in addition to lying in planes that are normally disposed with respect to the plane of the slot 212.

The drop out body 210 is formed with the conventional internally threaded bore 330 that receives the externally threaded stem 332 of conventional thumb screw 334 (see FIGS. 6 and 7) that is to be threadedly received in the drop out 42 to adjust the rear wheel shaft to its desired position when the rear wheel assembly is applied to the frame 10.

The body 200 is further formed with extension arm 336 that includes aperture 338 and shoulder 340 that are conventionally provided on the right hand drop outs for multigear gear bicycles to mount the familiar derailleur in the manner suggested in FIG. 7 (in phantom).

The drop out 44 (see FIG. 13), and specifically its body 200A, is basically the same as drop out body 200 except that the drop out body 200A does not require and therefore lacks the derailleur mounting arm 336 and associated parts, and in addition, the vent passage 300A of its stub portion 280A extends through the body 200A to vent passage 266A (at outlet port 304A) for purposes of venting the bore of the chain stay 30 through the drop out slot 212A when the subassembly 45 is assembled. The flange portion 298A of its socketed end portion 234A is on the outwardly facing side of drop out 44, as indicated in FIG. 13 (FIGS. 6 and 7 showing the inside surfacing of drop out 44, in this connection).

The seat stay-chain stay subassemblies 43 and 45 may be assembled in any desired order, it being preferred procedure to preassemble the fork subassembly 46 and the seat stay-chain stay subassemblies 43 and 44 prior to assembly of the frame 10.

As to the seat stay subassembly 43, assuming that the seat stay 22 and the chain stay 28 have been cut to appropriate size with their respective ends 102 and 104 squared off to define the respective terminal end portions 260 and 292, the tubular members represented by the stays 22 and 28 and the drop out 42 are suitable fixtured to dispose these components in the orientation they are to have with respect to each other in the frame 10 when it is assembled. This involves the terminal end portion 260 being inserted within the socket end portion 234 of body 200, while the terminal end portion 282 of the stay 28 is inserted within the socketed end portion 280 of stub portion 232; in both instances the stay terminal end portions 262 and 302, respectively, are applied flush against the respective planar or flat floors 240 and 285 of the respective stub portions 230 and 280. In the preferred fixtured relation, the subassembly 43 is disposed in upright relation with the stays 22 and 28 approximately equally angled upwardly with respect to and away from a vertical plane bisecting the angle between same.

As thus suitably fixtured, brazing cycles are respectively applied to the respective drop out stub portions 230 and 232, either simultaneously, or one at a time, in any desired order. In any event, a manually or machine operated brazing torch is ignited and the flame of same directed only at the stub portion 230 or 232 being processed, to the exclusion of the stay defining tubular member seated in the socketed end portions defined by same, with the portions of the stay tubes that are seated in the respective socketed end portions 234 and 280, respectively being heated by conduction as needed to achieve brazing temperatures. Again, at the appropriate time, brazing wire of a suitable type, such as that mentioned hereinbefore with regard to the front drop outs; is mechanically or manually fed into the confined spacing between the tubular strut ends and the stub portion wall surfacings that define the respective sockets 244 and 286, with the brazing wire liquifying as it is fed into place with the result that the brazing material and the capillary flow action involved penetrates into and throughout the entire spacing between the stub portion socket defining surfacings and the outer surfacing of the tubular stay defining members that are involved. This capillar flow action on the brazing filler metal also occurs at the flanging provided by the projections 248 and 298 of the respective stub portions 230 and 280, whereby the overlapping of the respective stay defining tubes by the respective stub portion projections involved serves to increase the strength of the joint that is defined by the brazing material that bonds the parts together at the respective socketed end portions of the body 200.

Alternately, as in the case of the front dropouts, the braze may be applied in the form of a performed brazing wire inserted in place into the confined spacing between the tubular strut ends and the stub portion wall surfacings that define the respective sockets 244 and 286, prior to applying brazing heat, which, as indicated hereinbefore in connection with the front dropouts, permits the use of a fully automatic brazing cycle without requiring the troublesome wire feeder. The liquifying and capillary flow action of the preinserted brazing wire is similar to that described, except that the braze wire needed is wholly in place when the brazing cycle is initiated.

The braze filler metal involved is confined to the space between the respective stay tubular member ends and the drop out side walls that define the respective drop out sockets so that the hardened braze filler metal is confined to such spacing and smoothly conforms where it is exposed at the sockets to the shaping of the drop out and stay components involved, eliminating the need to machine in these areas for aesthetic reasons.

The stay subassembly 45 is assembled in the same manner, whereby the respective stay subassemblies 43 and 45 are provided for application to the frame 10 in accordance with the disclosure of said pending application Ser. No. 543,398.

When the frame 10 has been assembled, and fork subassembly 46 is applied thereto, the front wheel assembly, generally indicated in phantom fragmental form at 360 in FIG. 3, is applied to the front drop outs 56 and 60 to fully cover the drop out vent passages 175 and 175A of same.

The rear wheel assembly, which is indicated in fragmental phantom form in FIG. 7 by reference numeral 362 is applied between the drop outs 42 and 44 in the usual manner, with a suitable derailleur 47 being suitably mounted on the mounting arm 336 of the drop out 42. The rear wheel assembly 362 fully covers the vent ports 270 at the slots 212 and 212A.

The arrangement of the drop out 42 permits the actuating cable 48 of derailleur to be disposed internally of the chain stay 28 from and through vent passage 300 to and through a suitable annular plastic bearing 363 mounted in stay 28 adjacent the bracket 38 (as suggested in FIG. 1), for application about the exterior of the bracket 38 and extension up to the usual operating hand lever that is mounted on the down tube 16 (not shown).

The said derailleur actuating cable 48 thus extends through the bore 289 of stay 28 and through the vent passage 300 thereof and into the conventional coil spring housing 370 of same, which in accordance with the invention has the ferrule 371 at one of its ends 372 applied in stopping relation in the countebore defined by port 304, and thus against the stub portion shoulder 316, and the other end 374 of housing 370 is anchored in the usual manner to the derailleur mechanism. This arrangement eliminates the need for the application of the usual derailleur cable housing stop and guide lug that is conventionally brazed to the exterior of the stay, as, for instance, on its underside, as well as the heating of the stay side walls that can only weaken the strength of the stay in this area.

FIGS. 14 and 15 show rear drop out 42B that may be employed in place of drop out 42 where the frame 10 is to be incorporated in a single speed or drive ratio bicycle, such as the common track bicycle. In this embodiment the drop out stub portion 232B is substantially centered on body plate portion 210B, in a manner similar to the stub portion 232A of drop out 44, and vent passage 300B communicated through drop out body 200B from the socket floor vent inlet port 302 to vent discharge port 304B at slot 212B. Otherwise drop out 42B is the same as drop out 42, except that slot 212B is oriented as is conventional for track bicycles.

The frame 10 is equipped in accordance with standard practices, after application thereto of the indicated drop outs.

As indicated, it is preferable that the drop outs 56, 60, 42 and 44 be formed by employing appropriate investment casting procedures whereby they may be accurately shaped to best serve the functions for which they are intended and without the disadvantages of the flashing formed by stamping or forging procedures (which requires machining to eliminate the flashing).

It will therefore be seen that the invention provides a number of significant improvements.

For instance, as indicated, both the front and rear drop outs may be accurately formed by utilizing suitable investment casting techniques, which eliminates the machining that has been heretofore required to eliminate the flashing of forged or stamped drop out components.

In both the front and rear drop outs, the tubular members represented by the fork blades for the front drop outs, and the tubular members represented by the seat and chain stays of the rear drop outs, are socket fit applied thereto with the end portions of the tubular members straight cut across the ends of the tubular members involved for full flush engagement with the drop out stub portion cross floors involved. Both the fork blades and the seat and chain stays may be cut to exact length fit for guaranteed length provision of these parts as distinguished from the uncertainty of length and modification of same that has been heretofore required.

The front and rear drop out vent passages fully eliminate the need for conventional vent hole formation in the tubular member side walls, which avoids the defacing and weakening of these components that has heretofore created problems of aesthetics and strength provision. Further, those of the drop out stub portions that are vented through the drop out body to the operating slots thereof fully hide the vent passage that is necessary to vent brazing gases as well as cleaning chemical liquids, which in the rear drop out that is arranged for derailleur use, the vent passage outlet is hidden by the derailleur cable housing.

The brazing of the bicycle tubular strut components within the front and rear drop out socketed end portions avoids the need to machine the drop outs to blend the brazing with the drop out metal material since the brazed material now is limited to what is needed to bond the tubular components to the respective drop out socketed end portions, with the braze material neatly shaping under surface tension characteristics (prior to solidifying at the corners defined by the respective tubular members and drop out socket defining openings, to define external surfacing smoothly merging therewith.

The socket fit application of the fork blade and stay defining members to the respective drop out socketed end portions provides effective orientation of the respective parts involved, even before brazing, so that fixturing is simple and minimized, with resulting reduction or elimination of heat sink problems caused by fixturing required by prior practices and when brazing is completed, the tubular members involved are bonded in place in full alignment with two axes (one of the plane paralleling the central plane of the bicycle, and the other in a plane that is crosswise of the bicycle central plane). Both the front and rear drop outs as applied to their respective tubular members, as such tubular members are applied to the bicycle frame in question, will correctly align the drop out wheel assembly mounting slots at the front and rear of the bicycle for easy application thereto of the respective front and rear wheel assemblies in the usual manner.

As to the front drop outs, fixturing needs are confined to fixturing the fork tip involved to maintain its needed planar relationship to the top of the fork blade it is being brazed to (the top of fork blades conventionally being elliptical in transverse section with the long dimension thereof running from front to rear). The front drop outs by reason of their socket fit relation to the fork blades they are to be brazed to are self aligning therewith.

The canted formation of the planar surfaces 320 and 322 of the rear drop outs provides for easy thrust application of the rear wheel assembly in its operating position, keeping in mind that, in the proper orientation of the rear drop outs 42 and 44, the facing surfaces 322 and 320A of the drop outs 42 and 44 must be in parallelism in order to maintain the desired constant space therebetween that just slightly exceeds that of the remaining surfaces of the rear wheel axles adjusting nuts.

The venting passage arrangement for the chain stay receiving socketed end portion 280 of rear drop out 42 provides an effective end stop for the derailleur cable housing 370, and eliminates the need to braze on the chain stay tube the conventional derailleur cables housing stop.

Another important aspect of the rear drop out 42 is shown in FIG. 9 in which the rear wheel assembly 366 is shown to include a number of multi speed providing sprockets 363 for the indicated bicycle chain 365. Heretofore it has been necessary to shave the wall 290 of chain stay tube 28 so that the rear wheel assembly can be applied to and removed from the drop outs 42 and 43. By shifting the socketed end portion 280 of the drop out 42 outwardly of the bicycle frame somewhat, as indicated in FIG. 9, the outermost sprocket 363 will easily clear the stay 28 when the rear wheel assembly 362 is applied to and removed from the drop outs 42 and 44.

The arrangement that the invention provides, for applying the tubular members to the drop out socketed end portions, reduces the braze filler metal required for brazing purposes to that what is needed for effective bonding of the tubular member components to the drop out socketed end portions, as well as reducing the time for assembly of same and the resulting weight of the finished product. The socketed configuration at the drop out-tubular member joints involved provides a stronger joint, with less brazing material and requires no machining for aesthetic purposes. Further, the filler metal employed need not be of any special shape, and can be in the form of pastes, and performs, as well as wire.

While it is preferred that the venting passages for all the drop out socketed end portions be through the body of the drop out to the wheel shaft mounting slot of same, venting of the socket end portion may be to one side or the other of the drop out stub portion adjacent one of the outside facing surfacings of same (such as is illustrated for stub portion 280 of rear drop out 42).

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

What is claimed is:

1. A bicycle wheel drop out bracket comprising:

a generally flat body defining opposed side walls that define opposed face surfacings of the body that are coextensive with and define a generally planar plate portion of said body, said body in said plate portion thereof defining a drop out slot that extends from an open end thereof across the thickness of said body portion to define a bicycle wheel axle mounting way in said body that extends crosswise thereof, said body plate portion defining a relatively narrow marginal edging that connects said side walls along the perimeter of said body plate portion, said slot interrupting and extending across said edging to form said slot open end, said body including a stub portion substantially aligned with and projecting away from said body planar plate portion, said stub portion defining a socketed end portion forming an imperforate side wall structure in circumambient relation thereabout and that is in substantially squared relation with a substantially flat floor that extends crosswise of the plane of said body plate portion, said stub portion side wall structure including a flange projecting outwardly of and generally parallel to said end portion and normally of said floor.

said vent passage extending through said body to said slot.

2. The drop out bracket set forth in claim 1 wherein:

said stub portion side wall structure is round in configuration and is substantially centered on said body to define a second external shoulder projecting laterally of the other of said opposed side walls.

3. A bicycle wheel drop out bracket and stay subassembly comprising:

a generally flat body forming said bracket and defining opposed side walls that define opposed face surfacings of the body that are coextensive with and define a generally planar plate portion of said body, said body in said plate portion thereof defining a drop out slot that extends from an open end thereof across the thickness of said body portion to define a bicyle wheel axle mounting way in said body that extends crosswise thereof, said body plate portion further defining a relatively narrow marginal edging that connects said side walls along the perimeter of said body plate portion, said slot interrupting and extending across said edging to form said slot open end, said body including a stub portion substantially aligned with and projecting away from said body planar plate portion, said stub portion defining a socketed end portion forming an imperforate side wall structure in circumambient relation thereabout and that is in substantially squared relation with a substantially flat floor that extends crosswise of the plane of said body plate portion, said stub portion side wall structure being round is configuration and substantially centered on said body plate portion to define at each of said side walls an external shoulder projecting laterally of said body plate portion, said body being formed to define a vent passage venting through said stub portion floor, and a tubular stay member having an end portion externally proportioned for close fitting relation within said stub portion socketed end portion with respect to said side wall structure thereof, said stay member end portion being open and defining a terminous that is squared off with respect to said stay member;

said stay member end portion being received within said stub portion socketed end portion with said terminous thereof seated against said stub portion floor and bonded to said side wall structure by braze bonding material, said stub portion side wall structure over one of said shoulders including a flange projecting parallel to said stay end portion and in said close fitting relation thereto, with said flange being lap bonded to said stay member by said braze bonding material, said vent passage extending through said body to said slot.

4. A bicycle wheel fork tip drop out bracket and fork blade subassembly comprising:

a generally flat body forming said bracket and defining opposed side walls that define opposed face surfacings of the body that are coextensive with and define a generally planar plate portion of said body, said body in said plate portion thereof defining a drop out slot that extends from an open end thereof across the thickness of said body portion to define a bicycle wheel axle mounting way in said body that extends crosswise thereof, said body plate portion further defining a relatively narrow marginal edging that connects said side walls along the perimeter of said body plate portion, said slot interrupting and extending across said edging to form said slot open end, said body including a stub portion substantially aligned with and projecting away from said body planar plate portion, said stub portion defining a socketed end portion forming an imperforate side wall structure in circumambient relation thereabout and that is in substantially squared relation with a substantially flat floor that extends crosswise of the plane of said body plate portion, said stub portion side wall structure being round in configuration and substantially centered on said body plate portion to define at each of said side walls an internal shoulder projecting laterally of said body plate portion, said body being formed to define a vent passage venting through said stub portion floor, and a tubular fork blade member having an end portion externally proportioned for close fitting relation within said stub portion socketed end portion with respect to said side wall structure thereof, said fork blade member end portion being open and definging a terminous that is squared off with respect to said fork blade member, said fork blade member end portion being received within said stub portion socketed end portion with said terminous thereof seated against said stub portion floor and bonded to said side wall structure by braze bonding material, said stub portion side wall structure over one of said shoulders including a flange projecting parallel to said fork blade end portion and in said close fitting relation thereto, with said flange being lap bonded to said fork blade member by said braze bonding material, said vent passage extending through said body to said slot.

5. In a bicycle frame that comprises a plurality of tubular members interconnected to form a diamond shaped frame structure that is aligned with a central plane substantially bisecting same, which frame includes a head tube, a top tube, a down tube and a seat tube that are coplanar with said plane, said frame further including a pair of rearwardly located and downwardly directed right hand and left hand seat stay tubes disposed in coplanar relation with a first cross plane that is rearwardly and downwardly angled, and extends normally of said central plane, which seat stay tubes are in spaced apart coextensive relation relative to each other and are similarly disposed relative to said central plane on either side of same, and a pair of rearwardly located and extending right hand and left hand chain stay tubes that are disposed in coplanar relation with a second cross plane that is rearwardly directed and normally of said central plane, which chain stay tubes are in spaced apart coextensive relation relative to each other and are similarly disposed relative to said central plane on either side of same, with the top tube and the down tube being fixed at their forward ends to the head tube, with the lower ends of the down tube and the seat tube and the forward ends of the chain stay tubes being fixed to a bottom bracket centered on said central plane, with the rear end of the top tube and the upper ends of the seat tube and seat stay tubes being fixed together at a seat lug centered on said central plane, and the lower ends of the respective right and left hand seat stay tubes and the rear ends of the respective right and left hand chain stay tubes being respectively fixed together in side-by-side but spaced apart relation of right hand and left hand rear wheel drop out brackets similarly spaced to either side of said central plane, said rear wheel drop out brackets each comprising:

a generally flat body defining opposed side walls that define opposed face surfacings of the body that are coextensive with and define generally planar plate portion of said body, said body in said plate portion thereof defining a drop out slot that extends from an open end thereof across the thickness of said body portion to define a bicycle wheel axle mounting way in said body that extends crosswise thereof, said body plate portion further defining a relatively narrow marginal edging that connects said side walls along the perimeter of said body plate portion, said slot interrupting and extending across said edging to form said slot open end, said body including first and second stub portions each substantially aligned with and projecting away from said body planar plate portion, said stub portions each defining a socketed end portion forming an imperforate side wall structure in circumambient relation thereabout and that is in substantially squared relation with a substantially flat floor that extends crosswise of the plane of said body plate portion, said side wall structures of said stub portions, respectively, being round in configuration and being substantially centered on said body plate portion to define at each of said side wall structures an external shoulder projecting laterally said body plate portion, said stub portion side wall structure each defining over one of said shoulders thereof a flange projecting outwardly of and generally parallel to the stub end portion defined by same, said body being formed to define a vent passage for each of said stub portions venting through each of said stub portion floors, with the right hand drop out bracket having its respective stub portions aligned with the respective right hand seat stay and chain stay tubes, said right hand stay tubes each having an end portion externally proportioned for close fitting relation within the respective right hand drop out bracket stub portion socket end portions with respect to said wall structure thereof, with said right hand stay tube end portions each defining a terminus that is squared off with respect to the stay tube it forms a part of, said right hand stay tube end portions each being open and respectively being received within the respective right hand drop out bracket stub portion socket end portions with said terminus thereof seated against the respective stub portion floors and bonded to the respective stub portion side wall structure including the respective flanges of same, by braze bonding material, said left hand stay tubes each having an end portion externally proportioned for close fitting relation within the respective left hand drop out bracket stub portion socket end portions with respect to said wall structure thereof, with said left hand stay tube end portions each defining a terminus that is squared off with respect to the stay tube it forms a part of, said left hand stay tube end portions each being open and respectively being received within the respective left hand drop out bracket stub portion socket end portions with said terminus thereof seated against the respective stub portion floors and bonded to the respective stub portions side walls structure including the respective flanges of same by braze bonding material, said vent passage of said right hand drop out bracket seat stay tube receiving stub end portion extending through said body thereof to said slot thereof, said right hand drop out bracket chain stay tube receiving stub end portion vent passage being open between the stub portion floor thereof and one of said shoulders thereof, which said one shoulder thereof is disposed facing outwardly of the bicycle frame.

6. The improvement set forth in claim 5 wherein:

said right hand drop out bracket has derailleur means operatively mounted on same, and including cable means connected to said derailleur means and arced forwardly of said frame and passed through said right hand drop out bracket chain stay tube receiving stub end portion vent passage and throught the right hand chain stay for operative connection to operating means therefor.

7. In a bicycle frame that comprises a plurality of tubular members interconnected to form a diamond shaped frame structure that is aligned with a central plane substantially bisecting same, which frame includes a head tube, a top tube, a down tube and a seat tube that are coplanar with said plane, said frame further including a pair of rearwardly located and downwardly directed right hand left hand seat stay tubes disposed in coplanar relation with a first cross plane that is rearwardly and downwardly angled and extends normally of said central plane, which seat stay tubes are in spaced apart coextensive relation relative to each other and are similarly disposed relative to said central plane on either side of same, and a pair of rearwardly located and extending right hand and left hand chain stay tubes that are disposed in coplanar relation with a second cross plane that is rearwardly directed and normally of said central plane, which chain stay tubes are in spaced apart coextensive relation relative to each other and are similarly disposed relative to said central plane on either side of same, with the top tube and the down tube being fixed at their forward ends to the head tube, with the lower ends of the down tube and the seat tube and the forward ends of the chain stay tubes being fixed to a bottom bracket centered on said central plane, with the rear end of the top tube and the upper ends of the seat tube and seat stay tubes being fixed together at a seat lug centered on said central plane, and the lower ends of the respective right and left hand seat stay tubes and the rear ends of the respective right and left hand chain stay tubes being respectively fixed together in side-by-side but spaced apart relation to right hand and left hand rear wheel drop out brackets similarly spaced to either side of said central plane, said rear wheel drop out brackets each comprising:

a generally flat body defining opposed side walls that define opposed face surfacings of the body that are coextensive with and define a generally planar plate portion of said body, said body in said plate portion thereof defining a drop out slot that extends from an open end thereof across the thickness of said body portion of define a bicycle wheel axle mounting way in said body that extends crosswise thereof, said body plate portion further defining a relatively narrow marginal edging that connects said walls along the perimeter of said body plate portion, said slot interrupting and extending across said edging to form said slot open end, said body including first and second stub portions each substantially aligned with and projecting away from said body planar plate portion, said stub portions each defining a socketed end portion forming an imperforate side wall structure in circumambient relation thereabout and that is in substantially squared relation with a substantially flat floor that extends crosswise of the plane of said body plate portion, said side wall structures of said stub portions, respectively, being round in configuration and being substantially centered on said body plate portion to define at each of said side wall structures an external shoulder projecting laterally of said body plate portion, said stub portion side wall structures each defining over one of said shoulders thereof a flange projecting outwardly of said generally parallel to the stub end portion defined by same, said body being formed to define a vent passage for each of said stub portions venting through each of said stub portion floors, with the right hand drop out bracket having its respective stub portions aligned with the respective right hand seat stay and chain stay tubes, said right stay tubes each having an end portion externally proportioned for close fitting relation within the respective right hand drop out bracket stub portion socket end portions with respect to said wall structure thereof, with said right hand stay tube end portions each defining a terminus that is squared off with respect to the stay tube it forms a part of, said right hand stay tube end portions each being open and respectively being received within the respective right hand drop out bracket stub portion socket end portions with said terminus thereof seated against the respective stub portion floors and bonded to the respective stub portion side wall structures including the respective flanges of same, by braze bonding material, said left hand stay tubes each having an end portion externally proportioned for close fitting relation within the respective left hand drop out bracket stub portion socket end portions with respect to said wall structure thereof, with said left hand stay tube end portions each defining a terminus that is squared off with respect to the stay tube it forms a part of, said left hand stay tube end portions each being open and respectively being received within the respective left hand drop out bracket stub portion socket end portions with said terminus thereof seated against the respective stub portion floors and bonded to the respective stub portion side wall structures including the respective flanges of same by braze bonding material, said vent passage of said left hand drop out bracket seat stay tube receiving stub end portion extending through said body thereof to said slot thereof, said vent passage of said left hand drop out bracket chain stay tube receiving stub end vent passage extending through said body thereof to said slot thereof.

8. In a bicycle frame that comprises a plurality of tubular members interconnected to form a diamond shaped frame structure that is aligned with a central plane substantially bisecting same, which frame includes a head tube, a top tube, a down tube and a seat tube that are coplanar with said plane, said frame further including a pair of rearwardly located and downwardly directed right hand and left hand seat stay tubes disposed in coplanar relation with a first cross plane that is rearwardly and downwardly angled and extends normally of said central plane, which seat stay tubes are in spaced apart coextensive relation to each other and are similarly disposed relative to said central plane on either side of same, and a pair of rearwardly located and extending right hand and left hand chain stay tubes that are disposed in coplanar relation with a second cross plane that is rearwardly directed and normally of said central plane, which chain stay tubes are in spaced apart coextensive relation relative to each other and are similarly disposed relative to said central plane on either side of same, with the top tube and the down tube being fixed at their forward ends to the head tube, with the lower ends of the down tube and the seat tube and the forward ends of the chain stay tubes being fixed to a bottom bracket centered on said central plane, with the rear end of the top tube and the upper ends of the seat tube and seat stay tubes being fixed together at a seat lug centered on said central plane, and the lower ends of the respective right and left hand seat stay tubes and the rear ends of the respective right and left hand chain stay tubes being respectively fixed together in side-by-side but spaced apart relation to right hand and left hand rear wheel drop out brackets similarly spaced to either side of said central plane, said rear wheel drop out brackets each comprising:

a generally flat body defining opposed side walls that define opposed face surfacings of the body that are coextensive with and define a generally planar plate portion of said body, said body in said plate portion thereof defining a drop out slot that extends from an open end thereof across the thickness of said body portion to define a bicycle wheel axle mounting way in said body that extends crosswise thereof, said body plate portion further defining a relatively narrow marginal edging that connects said side walls along the perimeter of said body plate portion, said slot interrupting and extending across said edging to form said slot open end, said body including first and second stub portions each substantially aligned with and projecting away from said body planar plate portion, said stub portions each defining a socketed end portion forming an imperforate side wall structure in circumambient relation thereabout and that is in substantially squared relation with a substantially flat floor that extends crosswise of the plane of said body plate portion, said side wall structures of said stub portions, respectively, being round in configuration and being substantially centered on said body plate portion to define at each of said side wall structures an external shoulder projecting laterally of said body plate portion, said stub portion side wall structures each defining over one of said shoulders thereof a flange projecting outwardly of and generally parallel to the stub end portion defined by same, said body being formed to define a vent passage for each of said stub portions venting through each of said stub portion floors, with the right hand drop out bracket having its respective stub portions aligned with the respective right hand seat stay and chain stay tubes, said right hand stay tubes each having an end portion externally proportioned for close fitting relation within the respective right hand drop out bracket stub portion socket end portions with respect to said wall structure thereof, with said right hand stay tube end portions each defining a terminus that is squared off with respect to the stay tube it forms a part of, said right hand stay tube end portions each being open and respectively being received within the respective right hand drop out bracket stub portion socket end portions with said terminus thereof seated against the respective stub portion floors and bonded to the the respective stub portion side wall structures including the respective flanges of same, by braze bonding material, said left hand stay tubes each having an end portion externally proportioned for close fitting relation within the respective left hand drop out bracket stub portion socket end portions with respect to said wall structure thereof, with said left hand stay tube end portions each defining a terminus that is squared off with respect to the stay tube it forms a part of, said left hand stay tube end portions each being open and respectively being received within the respective left hand drop out bracket stub portion socket end portions with said terminus thereof seated against the respective stub portion floors and bonded to the respective stub portion side wall structures including the respective flanges of same by braze bonding material, said vent passage of said right hand drop out bracket seat stay tube receiving stub end portion extending through said body thereof to said slot thereof, said right hand drop out bracket chain stay tube receiving stub end portion vent passage being open between the stub portion floor thereof and through said body thereof to said slot thereof for venting at said slot thereof.

* * * * *